United States Patent
Lu et al.

(10) Patent No.: US 11,113,344 B2
(45) Date of Patent: Sep. 7, 2021

(54) AUTOMATED DISCOVERY OF NETWORK CAMERA IN HETEROGENEOUS WEB PAGES

(71) Applicant: Purdue Research Foundation, West Lafayette, IN (US)

(72) Inventors: Yung-hsiang Lu, West Lafayette, IN (US); Ryan Merrill Dailey, McLean, VA (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/846,365

(22) Filed: Apr. 12, 2020

(65) Prior Publication Data

US 2020/0327174 A1    Oct. 15, 2020

Related U.S. Application Data

(60) Provisional application No. 62/833,535, filed on Apr. 12, 2019, provisional application No. 62/866,572, filed on Jun. 25, 2019.

(51) Int. Cl.
| | |
|---|---|
| *G06F 15/173* | (2006.01) |
| *G06F 16/951* | (2019.01) |
| *H04L 29/08* | (2006.01) |
| *H04L 29/12* | (2006.01) |
| *G06F 16/958* | (2019.01) |
| *G06F 16/955* | (2019.01) |

(52) U.S. Cl.
CPC ......... *G06F 16/951* (2019.01); *G06F 16/958* (2019.01); *G06F 16/9566* (2019.01); *H04L 61/1511* (2013.01); *H04L 67/02* (2013.01)

(58) Field of Classification Search
CPC .. G06F 16/951; G06F 16/958; G06F 16/9566; H04L 61/1511; H04L 67/02
See application file for complete search history.

(56) References Cited

U.S. PATENT DOCUMENTS

2017/0280106 A1* 9/2017 Malik ................. H04L 67/10

OTHER PUBLICATIONS

Kaseb et al., Worldview and route planning using live public cameras. In Proc. SPIE, vol. 9408. 94080I-94080I-8, 2015.
(Continued)

*Primary Examiner* — Wing F Chan
*Assistant Examiner* — Joseph R Maniwang
(74) *Attorney, Agent, or Firm* — Piroozi-IP, LLC

(57) ABSTRACT

A method for indexing network camera data across heterogeneous web page structures is disclosed, which includes receiving a list of predetermined file formats, generating a list of IP network camera IP addresses, sending requests to each of the IP addresses, including transmitting a HTTP request to each IP address in the list, based on a response or lack thereof determine if an IP address is i) a network camera thereby adding the IP address to a list of network cameras, ii) a website thereby adding the IP address to a list of websites to be further investigated, or iii) an address void of network camera information thereby skipping the IP address, and crawling the IP addresses that have been determined to be websites using a web crawler identifying IP addresses of network cameras and resource path associated therewith and adding the same to the list of network cameras.

20 Claims, 24 Drawing Sheets

(56) References Cited

OTHER PUBLICATIONS

Lu et al., Privacy Protection in Online Multimedia. In Proceedings of the 25th ACM International Conference on Multimedia (MM '17). ACM, New York, NY, USA, 457-459, 2017.
Mao et al., CitySense: A Data Collection Approach for City Computing Applications. In Proceedings of the 1, 6th ACM Conference on Embedded Networked Sensor Systems (SenSys '18). ACM, New York, NY, USA, 379-380, 2018.
Millan-Garcia et al., An early fire detection algorithm using IP cameras. Sensors 12, 5 (2012), 5670-5686, 2012.
Nath et al., Challenges in building a portal for sensors world-wide. In First Workshop on World-Sensor-Web. Citeseer, 2006.
Vu et al., Measurement and Modeling of a Large-scale Overlay for Multimedia Streaming. In The Fourth International Conference on Heterogeneous Networking for Quality, Reliability, Security and Robustness & Workshops (QSHINE '07). ACM, New York, NY, USA, Article 3, 7 pages, 2007.
Yuan et al., Semantic Concept Learning through Massive Internet Video Mining. In 2008 IEEE International Conference on Data Mining Workshops. 847-853, 2008.
Manap et al., Face detection and stereo matching algorithms for smart surveillance system with IP cameras. In 2010 2nd EuropeanWorkshop on Visual Information Processing (EUVIP), 2010.
Baran et al., A Smart Camera for the Surveillance of Vehicles in Intelligent Transportation Systems. Multimedia Tools and Applications 75.17 (2016): 10471-0493.
Chen et al., Design and Implementation of a Real Time Video Surveillance System with Wireless Sensor Networks. In VTC Spring 2008—IEEE Vehicular Technology Conference. 218-222.
Chen et al., Web mining for Web image retrieval. Journal of the American Society for Information Science and Technology 52, 10 (2001), 831-839.
Dailey et al., Creating the World's Largest Real-Time Camera Network. In Imaging and Multimedia Analytics in a Web and Mobile World, 2017.
Deng et al., A large-scale hierarchical image database. In 2009 IEEE conference on computer vision and pattern recognition. Ieee, 248-255. , vol. 1, No. 1, Article 1. Publication date: Sep. 2020.
Gauen et al., Comparison of Visual Datasets for Machine Learning. In 2017 IEEE International Conference on Information Reuse and Integration (IRI). 346-355, 2017.
Guo et al., MS-Celeb-1M: A Dataset and Benchmark for Large-Scale Face Recognition. CoRR abs/1607.08221 (2016).
Halevy et al., The Unreasonable Effectiveness of Data. IEEE Intelligent Systems 24, 2 (Mar. 2009), 8-12, 2009.
Hallowell et al., Automated extraction of weather variables from camera imagery. In Proceedings of the 2005 Mid-Continent Transportation Research Symposium. Citeseer, 1-13, 2005.
Jacobs et al., The Global Network of Outdoor Webcams: Properties and Applications. In Proceedings of the ACM SIGSPATIAL International Conference on Advances in Geographic Information Systems (GIS '09). ACM, New York, NY, USA, 111-120, 2009.
Lu et al., See the World Through Network Cameras. Computer 52, 10 (Oct. 2019), 30-40, 2019.

* cited by examiner

FIG. 6

FIG. 7a: Streaming Camera
FIG. 7b: IP Camera

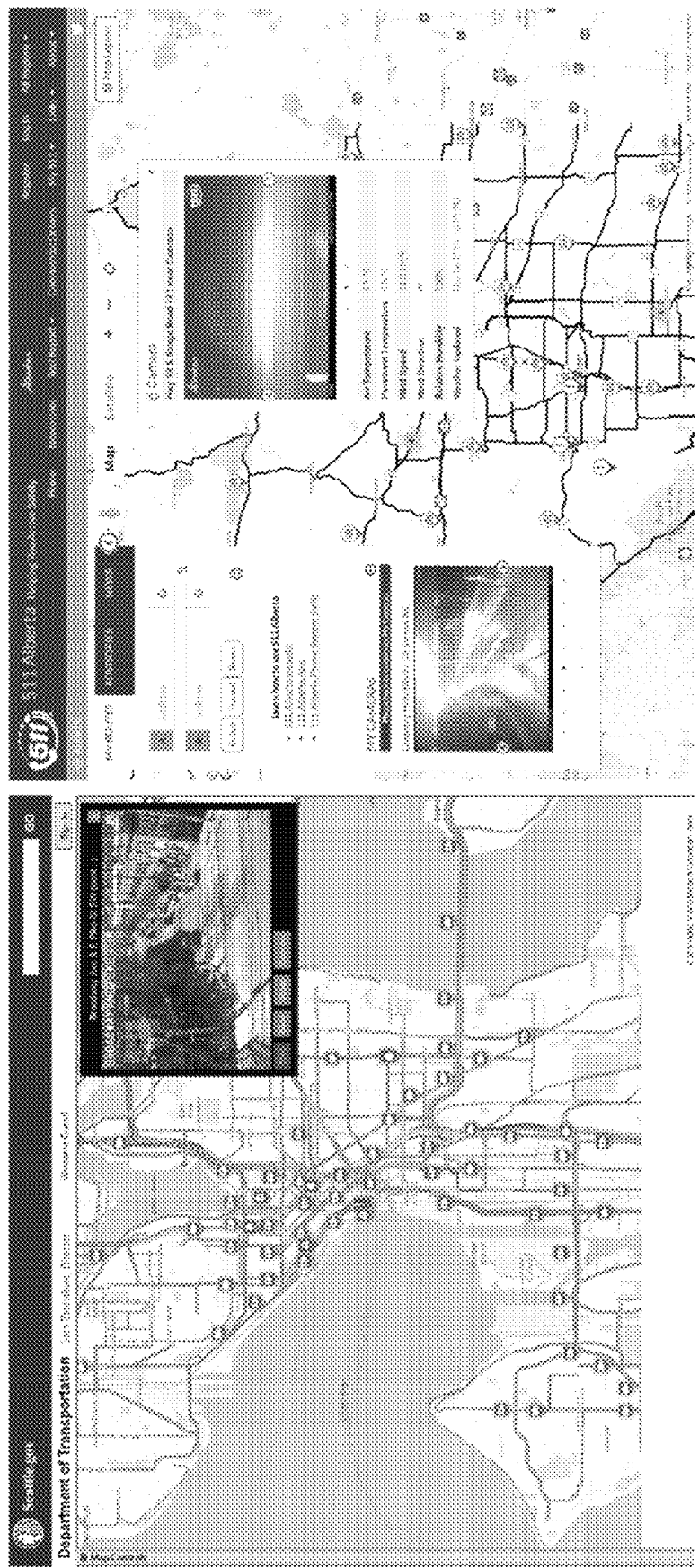
FIG. 9a: HERE
FIG. 9b: Third-party map

FIG. 12b JavaScript enabled.

FIG. 12a JavaScript disabled

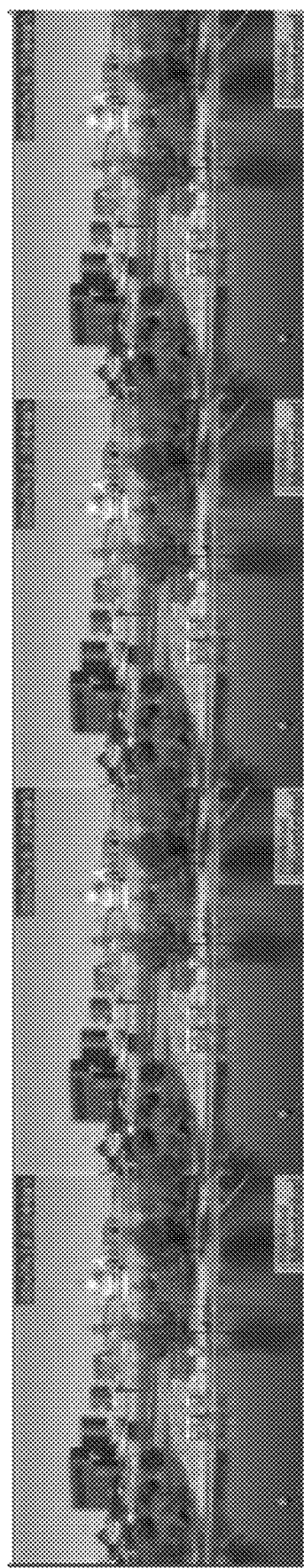
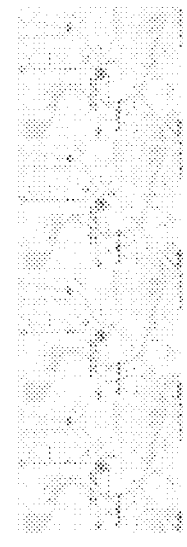
FIG. 17b
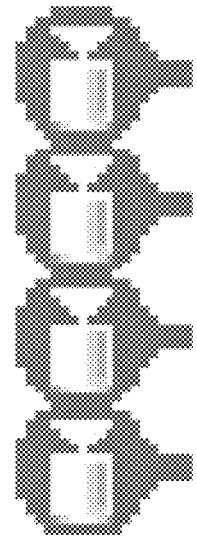
FIG. 17c
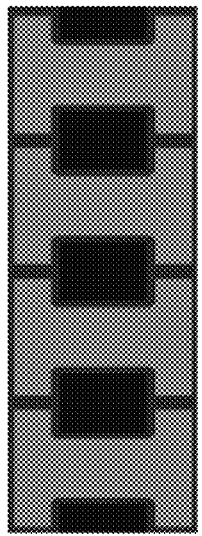

AUTOMATED DISCOVERY OF NETWORK CAMERA IN HETEROGENEOUS WEB PAGES

CROSS-REFERENCE TO RELATED APPLICATIONS

The present patent application is related to and claims the priority benefit of U.S. Provisional Patent Application Ser. No. 62/833,535 filed Apr. 12, 2019, and U.S. Provisional Patent Application Ser. No. 62/866,572, filed Jun. 25, 2019, the contents of each of which are hereby incorporated by reference in its entirety into the present disclosure.

STATEMENT REGARDING GOVERNMENT FUNDING

This invention was made with government support under ACI 1535108 awarded by the National Science Foundation. The government has certain rights in the invention.

TECHNICAL FIELD

The present disclosure is related to camera identification, and in particular related to identifying a number of network cameras in an automatic methodology.

BACKGROUND

This section introduces aspects that may help facilitate a better understanding of the disclosure. Accordingly, these statements are to be read in this light and are not to be understood as admissions about what is or is not prior art.

As the costs of sensors have declined, more sensor networks have been deployed by governments, hobbyists, and private entities. Network camera sensors offer rich contextual information and are used for weather, traffic, security, and other applications all around the world. Recent developments in deep learning techniques for machine vision have enabled camera sensors to play a deeper role in threat detection, route planning, and other applications.

Although more cameras have been deployed and machine vision has improved, the data from these sensors cannot be easily collected and adopted for new applications. Public data sources are often spread across websites from many organizations and are not easily accessed by the public. Currently, to find public data, one may use a search engine to identify websites that contain network camera data. For example, universities, regional transportation departments, news stations, and many other organizations in various localities and states have all deployed camera sensor networks. Suppose one is interested in identifying cameras in New York. The sites that distribute this data can be found by searching for "traffic cameras New York" or "New York webcams", but, as FIG. 1 shows, each of these organizations hosts the data on a different website preventing users from easily accessing all the relevant data at once. Furthermore, if users are able to find a website with relevant camera streams, organizations provide no way to download the relevant camera data from the website. Others in the prior art have attempted to solve the problem of data availability by aggregating network camera data from each site using a human-made parsing script. In their solution, a parsing script must be written for each site individually due to the heterogeneity of website structure and programming interface. The different structure of network camera websites can be seen in FIG. 1 where each example network camera website present the data in a different way. Some sites present the data in an interactive map loaded into the page using a JavaScript API. Other sites simply embed the network camera data directly in the HTML of the page. Writing a script for each website makes the camera sensor discovery processes inefficient. In addition, websites change over time and new cameras may be added. For example, FIGS. 2a and 2b show two screen-shots from Travel-Cam before and after the redesign. Changes in the website structures require updating the human-made scripts.

Therefore, there is an unmet need for a general solution that is adapted to automatically discover camera data from anywhere on the Internet to thus access the data from thousands of live network cameras to study traffic, weather, human behavior, and security across the world.

SUMMARY

A method for indexing network camera data across heterogeneous web page structures is disclosed. The method includes receiving a list of predetermined file formats associated with network camera data. The method also includes generating a list of IP addresses associated with potential network cameras. Furthermore, the method includes sending requests to each of the IP addresses. The request includes transmitting a HyperText Transfer Protocol (HTTP) request to each of the IP addresses in the list, thereby invoking a response. The request also includes waiting for a response from each of the IP addresses, wherein based on a response or lack of response from each IP address to the request determine if an IP address is i) a network camera thereby adding the corresponding IP address to a list of network cameras, ii) a website thereby adding the corresponding IP address to a list of websites to be further investigated, or iii) an IP address void of network camera information thereby skipping the IP address. The method further includes crawling the IP addresses that have been determined to be websites using a web crawler identifying IP addresses of network cameras and the IP address and resource path associated with network camera data and adding the identified IP addresses and resource paths to the list of network cameras.

BRIEF DESCRIPTION OF DRAWINGS

FIG. 2a shows Travel-Cam.net in February 2019, while FIG. 2b shows how the site had been redesigned by April 2019.

FIG. 6 shows an example of how network camera data changes over time. Both images were taken from the same IP Address and resource path.

FIGS. 7a and 7b are examples of different types of network camera data. In particular, FIG. 7a is an example of a streaming camera that uses a streaming video format to distribute the network camera data; while FIG. 7b, is an example of an IP camera that allows the network camera data to be downloaded from a HTTP server internal to the network camera.

in FIG. 8b, the user must interact with the webpage in order to load the network camera data; in FIG. 8c, another example of a streaming network camera (similar to FIG. 7a) is provided; and in FIG. 8d, an example of a website is shown which does not host network camera data directly on their server but instead links to other servers where the network camera data is hosted.

FIGS. 9a, 9b, 9c, and 9d show examples of different mapping APIs that may be used to display network camera data.

FIG. 17b shows examples of images that look similar to network camera images but do not change over time. FIG. 17c show examples of images that were not from network cameras.

FIG. 21a shows a thumbnail of the image on the right, while FIG. 21b shows the full size image located at a different URL.

DETAILED DESCRIPTION

Figure 1:
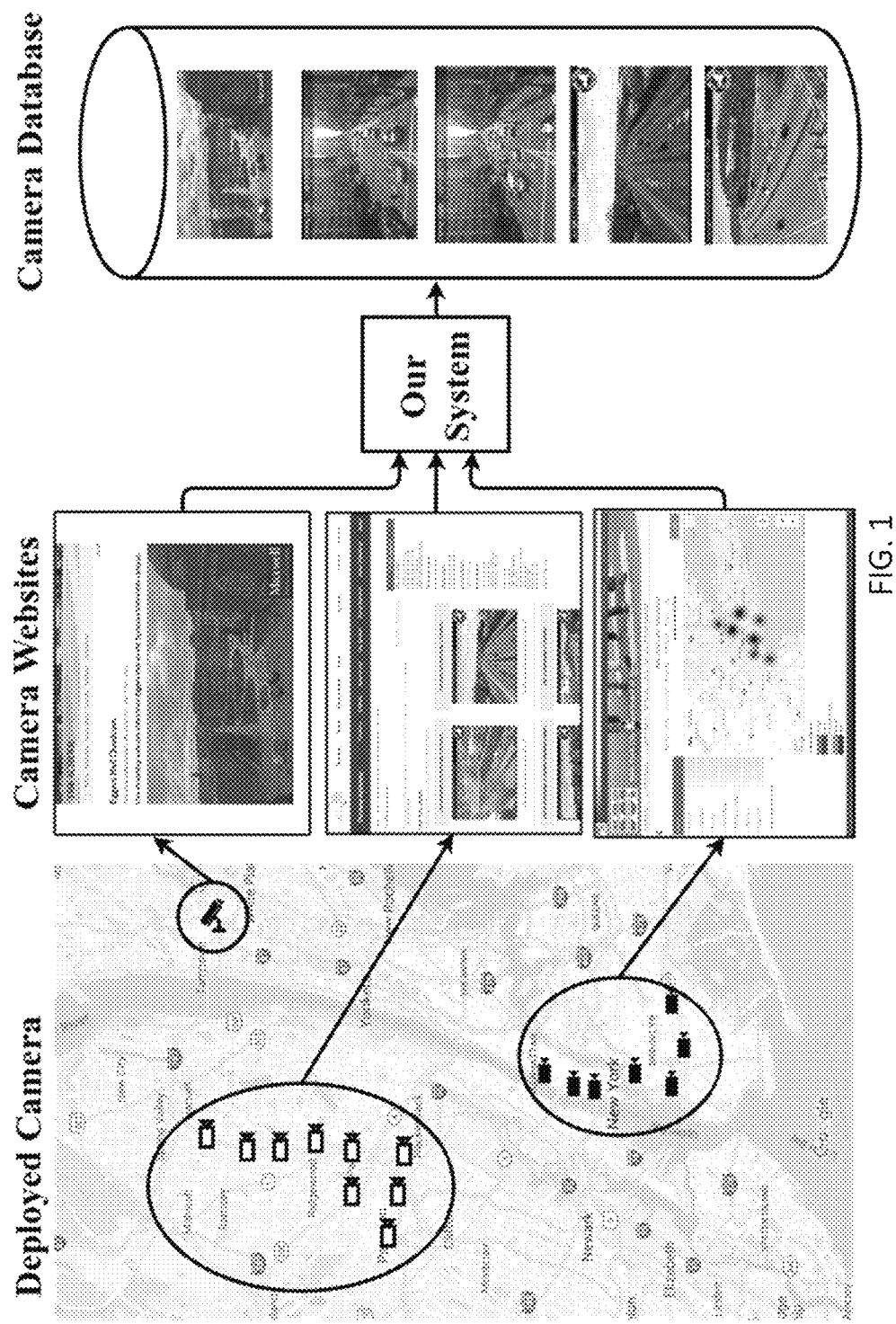
FIG. 1 is a schematic to show overview of the challenges addressed by the present disclosure. In particular, network cameras data is spread across many websites. The data from network cameras, (even cameras that are deployed across overlapping geographical areas) may be distributed across different websites. The system of the present disclosure automatically indexes the data from these sites and creates a central database of live network camera data.
Figures 2A, 2B:
FIGS. 2a and 2b are examples of how structure and style of web pages change over time. In particular.

The patent or application file contains at least one drawing executed in color. Copies of this patent or patent application publication with color drawing(s) will be provided by the Office upon request and payment of the necessary fee.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

Figures 3A, 3B:
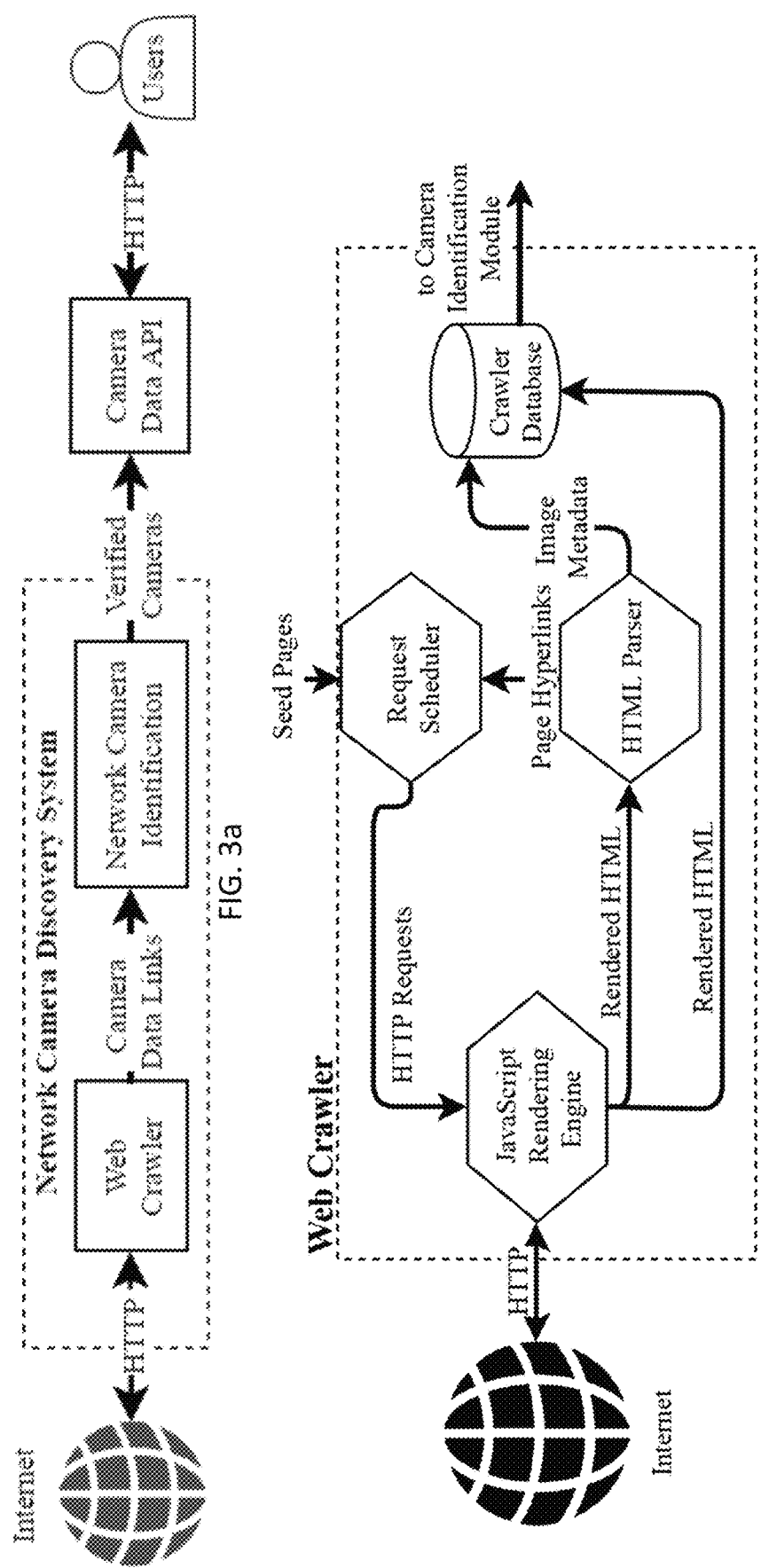
FIGS. 3a and 3b are block diagrams of the modules of a web crawler, according to the present disclosure, including (1) a Web Crawler Module that finds data links to common camera data formats; and (2) a Network Camera Identification Module that identifies whether links include network cameras.

The present disclosure provides a general solution that is adapted to automatically discover camera data from anywhere on the Internet. The methodology of the present disclosure is capable of automatic network camera discovery thereby eliminating the need for human interaction. The system, described with reference to FIGS. 3a-21b gives users direct access to the network camera data without the need to use a search engine or write a parsing script to extract the data from the website. FIGS. 3a and 3b, the system of the present disclosure includes two subsystems: (1) A Web Crawler Module that finds data links to common camera data formats and (2) A Network Camera Identification Module that identifies whether links include network cameras. To develop the solution represented by the system of the present disclosure, a sample of 73 sites were used to discover data from network cameras. These samples are used to identify characteristics of network camera websites. The characteristics common among the sites are then used to create a general system for automated discovery of network cameras. The system of the present disclosure has been actually reduced to evaluate the 73 sample sites.

The system of the present disclosure successfully discovered 41,518 cameras on the 73 target websites. Cameras were successfully identified on 64% of the websites tested. The accuracy of the system was determined by comparing the number of cameras found by the system of the present disclosure to a manual estimate of the number of cameras per site. The data identified as cameras by the system of the present disclosure was also spot checked for accuracy by manually labeling 2% of the data discovered by the crawler. Using the manually labeled samples, precision and recall for the system were found. These metrics are commonly used in binary classification problems to assess the accuracy of a system. Precision is a measure of proportion of network cameras correctly identified by the system of the present disclosure (true-positives) divided by the total number of cameras identified (true-positives+false-positives) and was found to be 97.2%. Recall is the percentage of cameras correctly identified by the system of the present disclosure (true-positives) divided by the total number of cameras in the sample (true-positives+false-negatives) and was found to be 97.2%. This shows that this system can identify a large number of cameras correctly from the sample according to the present disclosure. The overall accuracy of the crawler of the present disclosure is discussed in more detail below.

Sensor Data Mining and Aggregation

A system for aggregating publicly available sensor data from many sources using a web crawler is known to a person having ordinary skill in the art. They automatically collect public sensor data from government data archives, weather APIs, online comments, and other sources for the cities.

Web Service Discovery

The problem of automated discovery of network cameras is related to work done on automated web service discovery. The network cameras in this work can be treated as web services that respond to specifically formatted HTTP requests.

A deep web service crawler known to a person having ordinary skill in the art may be implemented. Due to the wide variety of services and interfaces available in the deep web, the crawler will identify from objects and generate probing queries to identify how the service behaves.

Methods known to a person having ordinary skill in the art can be used to identify if a web page contains RESTful web services by machine learning techniques. They concluded that pages with RESTful web services have unique page components endpoint, input, and output—and page structure. They used Naïve Bayes to detect feature terms in language contents of the web pages and used VSM (Vector Space Model) to detect structural features in HTML of the web pages. The two sets of features are weighted and used to determine if a webpage contains RESTful services.

Web Crawling and Content Categorization Data extraction from structured web pages using a template was presented in the prior art. These web scraping techniques required prior knowledge of the website structure and a standard layout to each web page. More advanced techniques learned web structure from human training examples. The prior art presents methods most similar to those used in the present disclosure for web page information extraction. This work uses information based on pattern discovery. Instead of using templates to extract structured data from websites, they automatically discover patterns in the web page structure. These patterns are then used to generate data extraction rules for each website. The system of the present disclosure leverages common patterns of network camera data websites to extract network camera data.

Various methods are known to a person have ordinary skill in the art to, e.g., classify web content using information beyond just the HTML webpage, where other types of data such as images and videos are incorporated to classify web content; or using HTML tags as a way to weight textual features on a website, where text sources are used from 4 different HTML tags: Body, Meta, Title, Meta and Title, and where three different feature selection techniques: information gain, word frequency, and doc frequency are used. In these methods, latent semantic indexing are employed thus working better for the document classification task then any feature selection techniques.

According to various embodiments, the present disclosure provides a flow that is depicted in FIG. 22.

Network Camera Website Analysis

Figure 4B:
FIGS. 4a and 4b show how different sites may have different styles and methods of interaction for similar tasks.
Figure 4A:
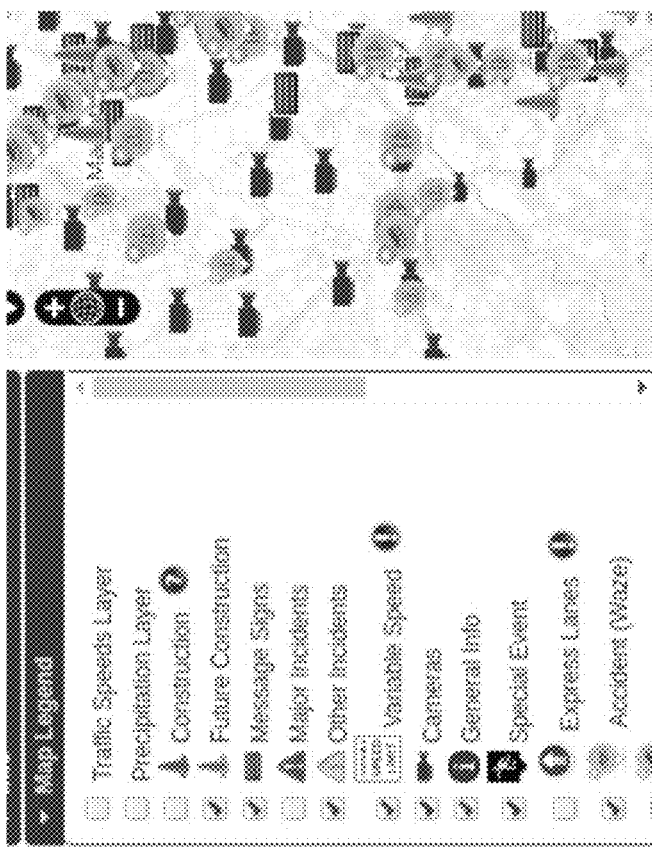

To create a general solution for discovering and indexing network camera data from a variety of websites, the formats and methods used to publish this data on the Internet must first be understood. Each website distributes camera data in a slightly different way. Some differences are obvious to the user; websites can organize the camera data as a list (FIGS. 8a, 8b, 8c, 8d) or as a map (FIGS. 9a, 9b, 9c, 9d). Humans can differentiate between these views and navigate them to access the camera data but automated solutions may not be able to differentiate between these different views. For example, FIGS. 4a, 4b show examples of different ways that users must interact to load the camera data into the sites. For FIG. 4a, the user must click on the camera icon in the map legend to load the camera data. In FIG. 4b, the user must also click to enable the camera data loading in the map. On this site, camera data is only loaded in the area where the user is viewing. To load all the camera data, the user must pan around the map.

These differences are easy for human users but can cause problems for automated solutions. In most cases, the implementation of the website is irrelevant to the user. Most users do not care if the camera data is presented in a map much less what programming interface the map uses. These differences can have a substantial impact on the automated network camera discovery system because it needs to determine an interaction method in order to retrieve data. A general solution that can automatically index network camera data must be flexible enough to deal with hundreds of different programming interfaces or exploit commonalties between views and implementations.

According to the system of the present disclosure potential commonalties must be identified that can be leveraged to create a generalized solution for discovering network camera data. A set of 73 sample websites were reviewed in detail and identified characteristics that are shared by sites distributing network camera data. The websites were selected to represent 6 common types of public network camera data listed in Table 1. Each site was manually studied to determine the formats and indexing methods used to display the camera data on the site. The number of cameras was also manually estimated for each site in order to judge the relative number of cameras that could be obtained by incorporating various methods into the network camera discovery module. The selected types and estimated number of cameras per type are displayed in Table 1.

TABLE 1

Distribution of types of camera websites studied

| Type | Num. Sites | App. Cams | Cams/Site |
| --- | --- | --- | --- |
| Aggregation | 8 | 27909 | 6977.25 |
| Traffic | 42 | 21755 | 505.93 |
| News Station | 1 | 502 | 502.00 |
| Tourism | 3 | 5062 | 1687.33 |
| University | 14 | 31 | 2.21 |
| Weather | 4 | 2712 | 678.00 |
| Total | 73 | 57971 | |

According to the present disclosure, a network camera is defined as having the following properties: The content of the data changes over time. FIG. 6 shows samples taken from the same data link at different times. The content of the data changes from the time the first sample is taken t0 to the time the second sample is taken t0+Δt. Both images are taken from the same data link (URL).

The content of the data link must change over time, for example, at least once every hour. If the content of the image does not change after one hour, the image is not considered to be a network camera.

Figure 5:
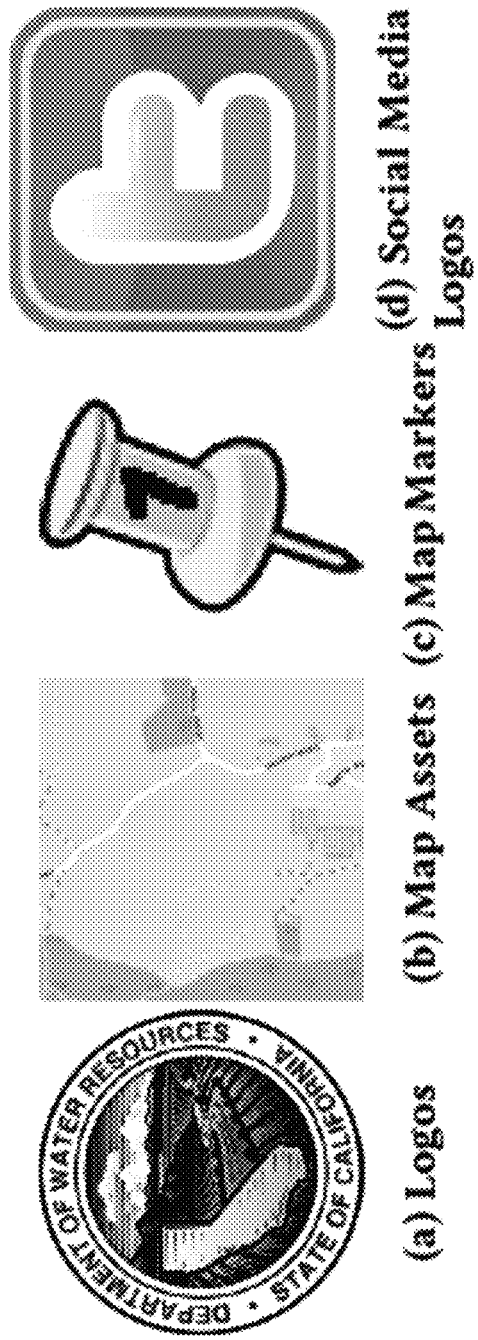
FIG. 5 provides examples of web assets that are not from live network cameras.

The image must contain useful information. For example, the image should be taken by a camera and not be computer generated. FIG. 5 shows examples of computer generated images that commonly occur on web pages. For this work, this data should not be considered network camera data even if they change between samples.

Network Camera Data Formats

The methods in which network camera data is distributed on the sample sites are described below. All network cameras on the sample websites distributed camera data in either Static Image or streaming video formats. In some cases, sites post a combination of both. Some sites also post interactive panoramas or short video clips updated every few minutes. According to the present disclosure, the two most common formats for public network camera data (1) Static Image and (2) Streaming Video, are placed in focus, according to the present disclosure. The characteristics of these formats for the 73 sample domains are next described.

Static Images. Static images, such as PNG and JPEG, are the most common format for public network camera data. Of the 73 sample domains, 57 provide at least some static images. These static images are snapshots from the camera and are updated intermittently. The user must send a new HTTP request to retrieve new data. For Static Image cameras, the users may be unaware that they are viewing a collection of static images because the image can be updated in the background of the web page using JavaScript.

In most cases, when new data is posted to the server, the link does not change. Each time an image is updated, the server overwrites the previous camera data. Sending a new HTTP request to the same link will yield new data. FIG. 6 shows an example of two samples taken by sending HTTP requests to the same camera data link. In most cases, the link structure will be similar to <base URL>/<camera id>.jpg. Links in this format usually do not change as new data is updated on the server.

In all but 3 of the static camera websites studied, the link remains the same as the data changes on the server. For one site, the links included a time-stamp and followed this format: <base>/<id>_<date-time>.jpg.

Camera data links on were updated hourly and followed <base>/<date>/<id>.jpg.

Finally, one site used an API request that simply incremented a number after the query string (<base>?<id>_<number>.jpg). Data links for each of these sites change between samples, making them more difficult to collect data therefrom. If an HTTP request is sent to the URL found at time t0 at any time after t0 the server will return an unchanged image. Although this behavior follows a predictable pattern for these examples, each website may be different. This heterogeneity makes it difficult to develop a generalized solution for collecting data.

For the user, these changes are imperceptible because a JavaScript function automatically updates the image. The change in URL makes it difficult to develop a general solution for aggregating network camera data from this type of websites. Although these cases are rare compared with those with static links, they show the heterogeneity of website structure and why indexing network camera data is difficult from site to site.

Links on several sites have formats similar to those on (<base URL>/<camera id>.jpg?<timestamp>). Each time the page is loaded, a new <timestamp> field is appended in the query string (text after the "?"). In this example, the query string does not affect the image that is returned from an HTTP request. For example, requests to: <base URL>/<camera id>.jpg?<timestamp> return the same image data as requests to: <base URL>/<camera id>.jpg.

Both requests return the most recent image taken from the camera. The query string may be removed with no effect. The way images are retrieved from network cameras are slightly different for every site making it difficult to retrieve the data. In 96% of the Static Image Camera sites studied, the network camera image data can be retrieved from the same link.

Streaming Cameras

Sites that distribute network camera data may do so in streaming video formats. The second most popular format for camera data is streaming formats such as HTTP Live Streaming (HLS), Motion JPEG (MJPEG), and Real-time Streaming Protocol (RTSP). Data from these Streaming Cameras usually have higher frame rates then data from Static Image Cameras, in some cases up to 60 frames per sec. Streaming Cameras are less common, as only 16 sites (22%) from the sample domains used a streaming format. The most common streaming format is MJPEG, which makes up about 43% of streams followed by HLS (38%) and RTMP (18%). In some cases, a single site offered more than one formats.

RTMP, RTSP, and HLS formats require an embedded video player to view the camera data in the browser. HLS camera data is loaded using an .m3u8 playlist file. One example of an HLS streaming camera can be seen in FIG. 7*a*. In 2 sites, the .m3u8 file is loaded automatically when the video player is loaded and requires no user interaction. The other 3 sites require the user to interact with the video player (press a play button) before an HTTP GET request is sent for the .m3u8 file. This type of interaction can make it difficult for camera data of this type to be automatically identified in the web page.

MJPEG streams can be directly embedded in the web page and do not need a video player to view. These streams are often from IP cameras (FIG. 7*b*) where the image data is hosted on an HTTP server internal to the camera. IP cameras will respond to a variety of HTTP requests allowing the user to get either static images, MJPEG video, or HLS video from the camera by sending specific HTTP requests.

Some streaming Cameras distribute data either using an HLS stream or an RTMP stream and require a video player to load in the browser to play the video. In some cases, an RTMP or HLS link can be found in an XHR (XMLHttpRequest) request (discussed further in below). This is usually needed when the link is loaded in the page automatically and does not require the user to click or interact with the page to load the video data. If user interaction is required, creating a general solution to index the data link is more difficult due to the variety of ways this interaction takes place.

Network Camera Site Organization

How camera data is organized and presented on the sample websites must be understood. The diversity of structure and organization within sample sites is greater than the formats discussed in below. The developers of each site may use different programming interfaces, making it difficult to find shared characteristics that can be used to create a generalizable indexing method. Some sites embed camera data links directly in the HTML of the page, other sites require the user to click a button or scroll on a map to load the camera data. FIGS. 8*a*-8*d* and 9*a*-9*d* depict the variability within the sample network camera sites. This heterogeneity makes it challenging to create a solution that can index cameras on every website with high accuracy.

After reviewing the sample websites, 2 methods were identified as most common for organization of the data on the pages: (1) Interactive Maps and (2) Camera Lists. The following subsections will analyze these 2 methods in more detail. In general, all 73 sample websites can be categorized into method (1) and (2) but variation exists between implementation details. This means that a method for discovering data from one website may not work on another website.

Figures 8A, 8B:
FIGS. 8a-8d are examples of different list formats across network camera data websites. In particular, in FIG. 8a all cameras are listed on one page with a sample image from the network camera.

In some cases, both Maps and Lists are used to organize the data on the same site. FIGS. 8*a* and 9*b* show screen shots from the Alberta Canada Department of Transportation website. This site, along with many other traffic camera sites studied, provides both an interactive map of the camera data and a list view of the camera data.

Data views differ and how camera data can be indexed from these views. The goal is to identify similar trends used by many websites that can be leveraged to build a generalized indexing solution.

List Views

Sites that provide a list view of the network camera data are of interest. 47 of the 73 (64%) of the sample sites provide a list view of the network camera data. FIGS. 8a-8d shows examples of different list views from the sample sites. The list views can further be broken down by studying how the data links are loaded into the pages.

In some cases, live image data is embedded in the HTML and loaded directly with the page. Many traffic camera websites provide list views where data links are directly embedded in the web page. FIG. 8a shows a screen-shot from Alberta 511. In this example, the site uses an API (Application Programming Interface) call to load camera data into the page. The most recent snapshot of network camera data is then automatically embedded in the HTML of the page. For these sites, parsing the HTML and extracting the <img src=" "> tags from the HTML will yield camera data links.

In other cases, indexing the camera data requires user interaction. These sites are the most difficult to automatically index due to the range of interactions needed to load the links. The site in FIG. 8b is an example from the Pennsylvania Department of Transportation. Here, no image data is loaded into the page until the user selects a region and a route from a drop down menu. After these parameters are selected, the user must select a camera location from the corresponding list. Image data from only one camera can be loaded at a time. For this type of site, there is no way to easily index the network camera data without a user interaction.

Figures 8C, 8D:

University cameras have different characteristics than many of the websites studied. 14 of the sample websites were from universities. Often universities will have no more than one or two network cameras looking at iconic areas around the campus. These cameras are not listed in a table on the site like the previous example. FIG. 8c for example shows a network camera from USC. University websites often contain thousands of pages with only a few cameras meaning an automatic solution would have to review thousands of pages with little chance of finding network cameras.

The final common type of list view is seen in aggregation sites. WorldCam.eu, seen in FIG. 8d, is one such aggregation site. These sites rely on user submissions to aggregate large numbers of network cameras. These aggregation sites have more cameras then other types of network camera websites but in many cases the data is not hosted directly on the site. This is the case for WorldCam.eu, only a few thumbnails are hosted directly on the WorldCam.eu servers. For the majority of other thumbnails, the site simply points to other websites that host the network camera. In all cases except one of the aggregation sites, the camera data is presented in a list view.

Map Views. Network camera sites commonly offer interactive map views of their camera data. 43 of the 73 (59%) sample sites presented camera data in map form. FIGS. 9a-9d show some examples of websites that use interactive maps. Map interfaces are especially common with traffic camera websites from regional departments of transportation (DoT). 90% of the DoT traffic camera websites had an interactive map. Often, maps on traffic camera sites also give live information about construction and traffic on the map as well as network camera data.

Interactive maps are similar to the list view shown in FIG. 8b because they don't embed the network camera data directly in the HTML of the page. For these sites, camera data is viewed inside the map (FIG. 9a), identified as HERE; or as a pop-up (FIG. 9b). For some sites, map markers link to another web page where the images from the camera are displayed. In 95% of sites studied, a JavaScript API is used to load an interactive map in the page and the image data is loaded directly in the map. The other 5% of sites use an HTML map loaded as an image in the web page. Table 2 lists the different APIs used by the 43 sample sites that had maps. JavaScript mapping APIs plot the location of each camera map and users can pan and zoom to see exact locations of each camera. These APIs require the client to make a call to the API and provide the geospatial information for the camera markers. In 70% of cases, the geospatial data for the camera markers was loaded with an XMLHttpRequest (XHR) to a JSON or XML file. XHR files can be found by monitoring the HTTP requests sent by the client during the page load. 82% of the geospatial XHR files also contained links to the network camera data streams. In many cases, information appears on a map when clicking on map markers. All the information that appears when clicking on a map marker is stored in an XHR file. Three of the sample websites contained network camera data embedded into a JavaScript file. Finding and parsing XHR data is an efficient method to index the camera data from but there are some issues with this method.

TABLE 2

Figure 9D:
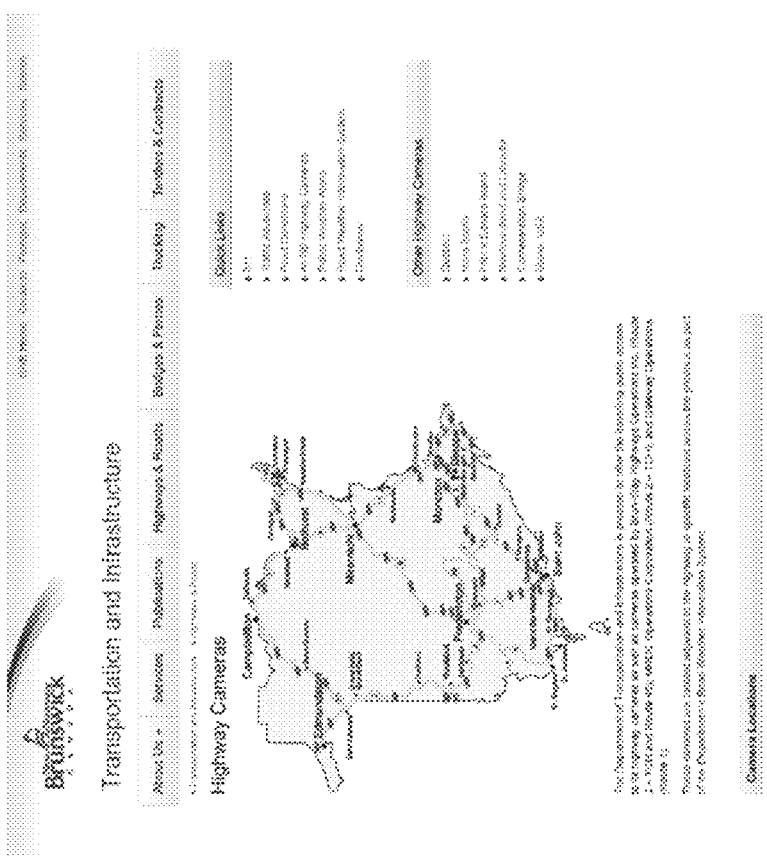
Figure 9C:
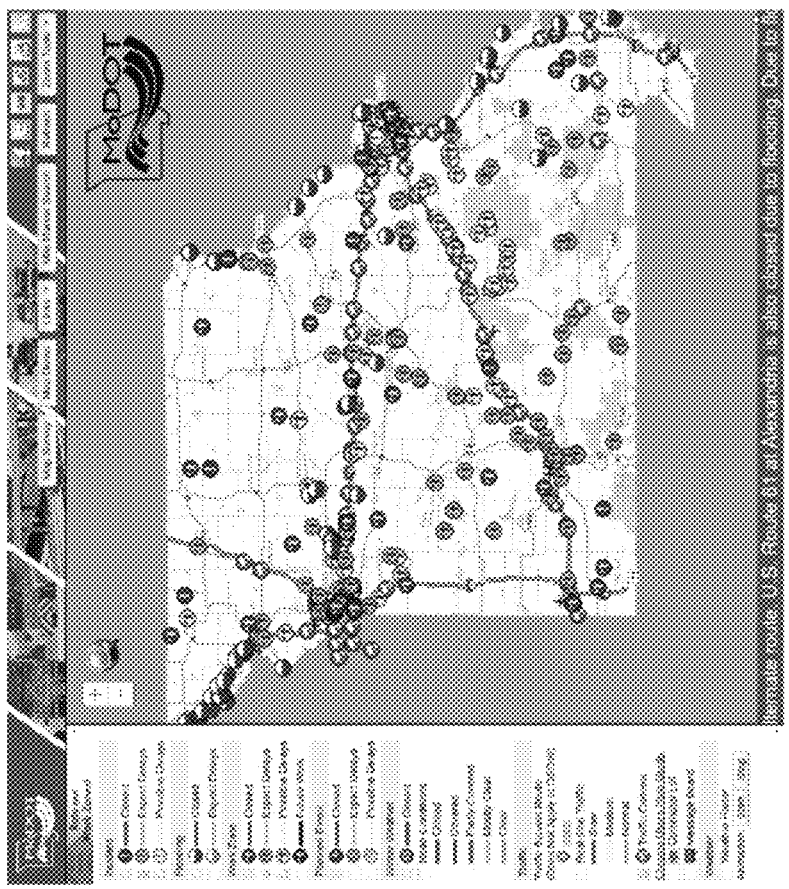

| APIs used by websites that had interactive maps | | |
|---|---|---|
| API | Number of Sites | Example |
| Google Maps | 18 | FIG. 9b |
| Openlayers | 8 | |
| ArcGIS | 7 | FIG. 9c |
| HERE | 4 | FIG. 9a |
| Leaflet | 3 | |
| HTML | 2 | FIG. 9d |
| Other | 1 | |
| Total | 43 | |

The first problem is that the XHR file cannot be found in some cases. In 15 sites the geospatial data is generated dynamically by a JavaScript function. In 5 sites, the geospatial data was found in the XHR file but no network camera data was found. For these sites, the camera data link is usually created by combining a base link with the camera ID in a JavaScript function.

For 5 sites, the request for the XHR file is not sent by the client until the user enables the camera markers on the map. In one case, as the user zooms and pans the map, XHR requests are sent in the background, loading small sections of the camera data at a time. Although this method was not common among the websites studied, this shows another example of the need of user interaction limiting the generalizability.

Methodology

Figure 10:
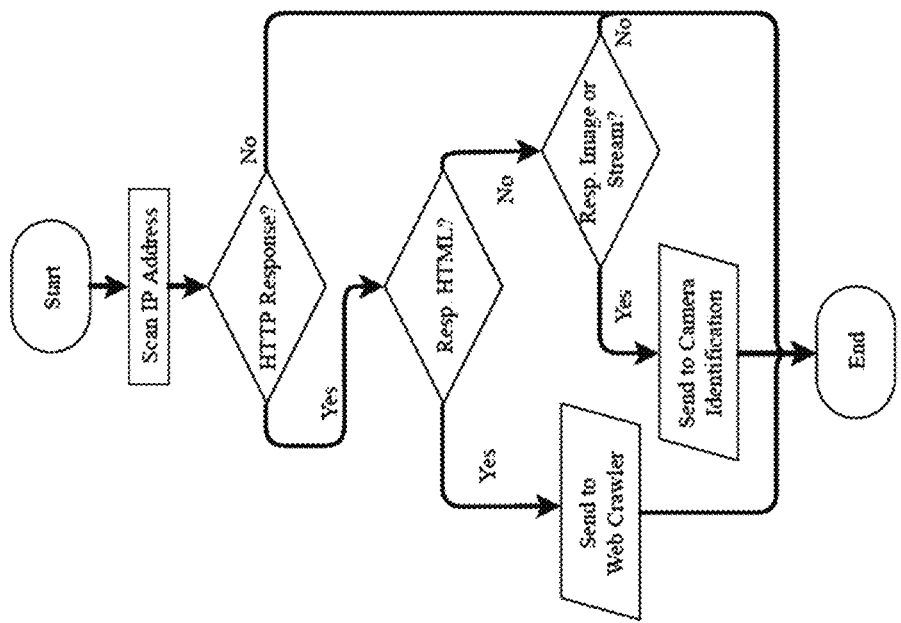
FIG. 10 is a flowchart showing how data moves through the system of the present disclosure.
Figure 11:
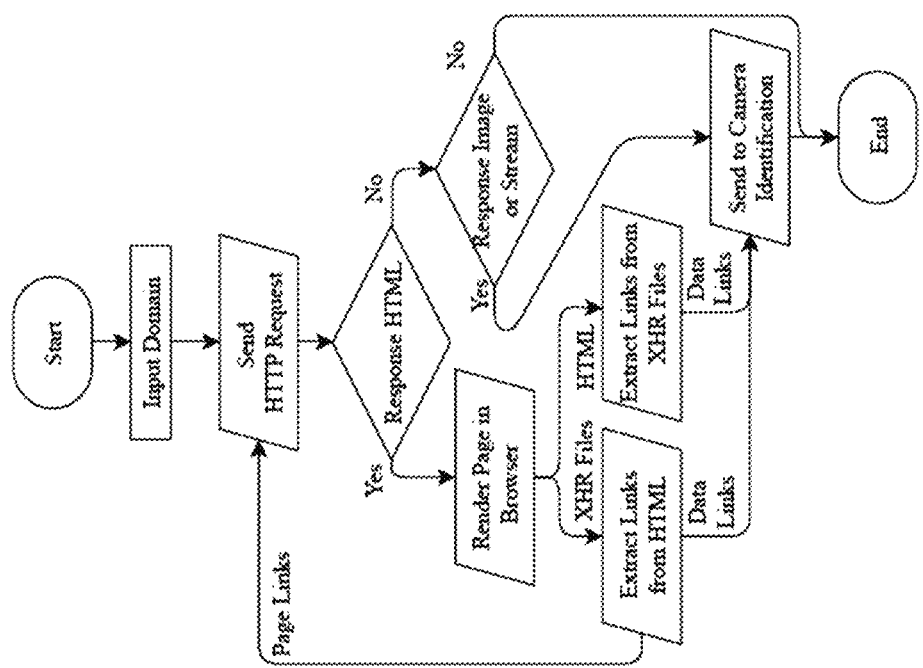
FIG. 11 is a flowchart of the Web Crawler Module.
Figure 12:
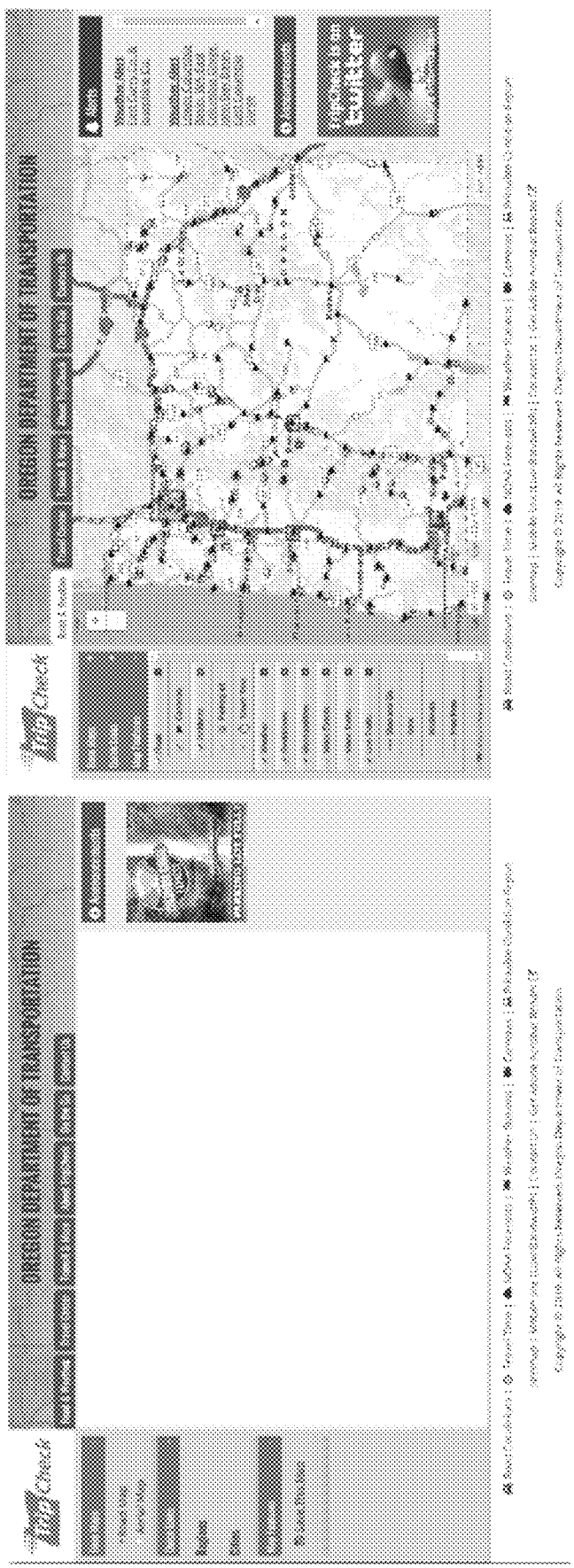
FIGS. 12a and 12b are examples of how the execution of JavaScript effects the loading of network camera data on webpages.
Figure 13:
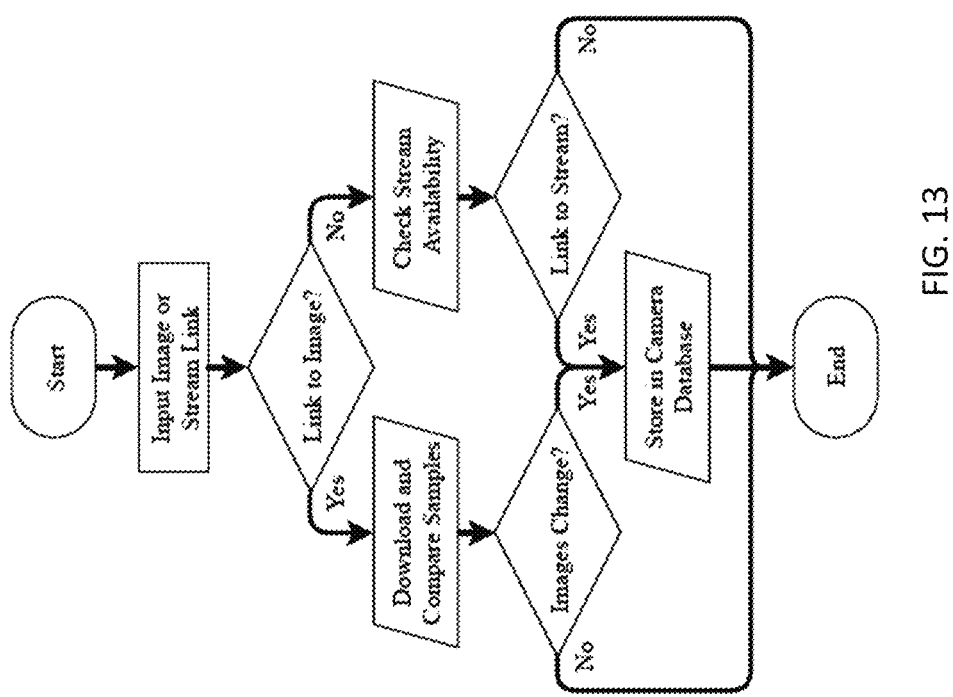
FIG. 13 is a flowchart of the Camera Identification Module.

FIG. 10 gives an overview of the flow of data through the proposed system for automated network camera discovery. Given an IP address or data link, the camera discovery system will determine if the link points to a website or if it points to a potential network camera. If the data link points to a website, the address is sent to the Web Crawler sub-module. If the address responds to the HTTP queries of known IP camera brands then the Web Crawler step is skipped and the address is sent directly to the Camera Identification submodule. If neither of these criteria are met, the address is likely not a network camera.

Web Crawler

If the IP address responds to HTTP requests with a web document, then the address points to a website that may contain many network cameras. To determine if network cameras exist on the website, a web crawler is used. The flowchart in FIG. 11 describes how the Web Crawler indexes links to potential network camera data.

For each web page link found, the Web Crawler downloads the web page and parses the HTML. Each page is rendered in a browser environment to ensure all the page assets are loaded properly. FIGS. 12a and 12b show why the rendering step (by Javascript) is important. In many cases, network camera data is loaded into the site using XHR requests. Without this step, network camera data can potentially be lost.

After the web page has been downloaded and rendered, the Crawler will parse the HTML response and look for types of data links common to network cameras such as image and video links. The Crawler will look for file extensions (such as .jpg or .png) as these are the most common formats of the Static Cameras studied according to the present disclosure. For Streaming Cameras, the Crawler will look for links to .m3u8, rtmp://, rtsp:// and .mjpg streaming formats.

While the browser environment is loading the page, it will monitor all XHR requests sent by the site. The Crawler Module will then parse the request URLs to look for common map API database files such as .json, .geojson, and .xml. These files are parsed for common network camera data links like the HTML pages.

The Web Crawler module will visit all pages linked from the initial index page for the purpose of looking for additional network camera data. In addition to looking for camera data links, the Crawler also looks for links to other web pages. Links are filtered to ensure the page has not been previously crawled and then sent to the Crawler queue.

At this stage, the extracted links have either been discarded, identified as web pages and sent back to the Crawler, or point to camera data formats (images or video). Next, any links that do not contain network camera data are filtered out using the Network Camera Identification module. The Web Crawler module records all links found in this stage of the system to ensure duplicate data links are not checked twice by the Network Camera Identification module. The next step in the discovery process is to determine which of the images discovered by the Web Crawler are network cameras using the Network Camera Identification module.

Identification of Cameras

After potential network camera data links have been identified, the Network Camera Identification sub-module determines if a given data link references network camera data. The purpose of this module is to separate web assets (FIG. 5) from network cameras (FIG. 6). Links found by the Web Crawler module are processed by the Network Camera Identification shown in FIG. 13. For each image data link, the Camera Identification module downloads several data samples at different times. After each sample is downloaded, they are compared to determine if there is any change between the samples. Because web assets like those in FIG. 5 are updated infrequently, they should not change between samples. Each sample is downloaded from the same link indexed by the crawler meaning that only cameras with static links will show change between samples. This behavior follows the definition of a network camera proposed herein.

For each streaming camera link indexed by the Web Crawler module, the Camera Identification module will establish a connection to the stream. The method used to establish this connection changes depending on the type of stream. For example, if the link is to an HLS stream, the Camera Identification module will send an HTTP request to download the .m3u8 playlist file. Using this playlist file, the module will connect to the stream and download camera data. The Camera Identification module will determine if the link is to a live stream by checking the duration and start time information for the video. The way this information is obtained depends on the streaming format used.

If an image or video data link passes the checks and is determined to be a network camera, it will be added to a database of network cameras, completing the network camera discovery process.

Implementation

Below the proof-of-concept implementation of the proposed end-to-end system for automated network camera discovery is provided.

Web Crawler Implementation

The proof-of-concept Camera Web Crawler is implemented in Python using the Scrapy web crawler framework. The Camera Web Crawler also employs the Splash web browser to render JavaScript on the crawled web pages. The indexed data found by the crawler is stored in a database. The Splash JavaScript Rendering Engine is responsible for sending the HTTP requests to the target web page. If Splash could not establish a connection to a page within 180 seconds, the page is discarded and the crawler moves on. After the crawler connected to the server and downloaded the web page, the JavaScript render engine waits for 8 seconds for the page to finish loading. This step ensures the JavaScript assets are loaded into the page before the rendered HTML is sent to the HTML parser.

The Crawler finds new pages within the seed domain to crawl by extracting the <a href=" "> tags extracted from the page. The contents of these tags link to other web pages. The crawler is restricted to following <a href=" "> tags that link to same domains. For example, if the seed website has the domain of www.example.com then the crawler follows links to www.example.com/cameras/ and www.example.subdomain.com/cameras/ but does not follow links to www.facebook.com/. This restriction prevents the crawler from spending time crawling websites outside the target domain for this proof-of-concept implementation. This will also prevent it from finding camera data that is not embedded on the target domain. Several sites discussed below do not host or embed camera data on their servers and this restriction will prevent this data from being found in this implementation.

In this implementation, the parameters given each web server's robots.txt file are respected. If the robots.txt file did not exist for a domain or if the site did not have specific crawling directives the following default parameters are used:

The crawler was limited to 32 connections per domain so as not to overwhelm the web servers. The crawler waited 3 seconds between requests to the same target domain.

Camera Identification Module Implementation

The Camera Identification module is implemented in Python. When a new image is indexed by the crawler module, the Module downloads a copy of that image and stores it in the database. The module samples each image 4 times. For each iteration, the image is downloaded from the same URL that was initially found by the web crawler.

The module determines whether or not an image indexed by the web crawler is from a network camera by comparing the change in luminance between the samples. The 4 image samples taken by the Camera Identification module are downloaded at the following times:

t0—When the image is first indexed by the crawler
t0+5 min
t0+60 min
t0+12 hrs

These times were chosen because a large change in luminance from the first sample at time t0 to time t0+12 hrs is often seen in outdoor network cameras.

Results

Network Camera Discovery Module Results

Figure 14:
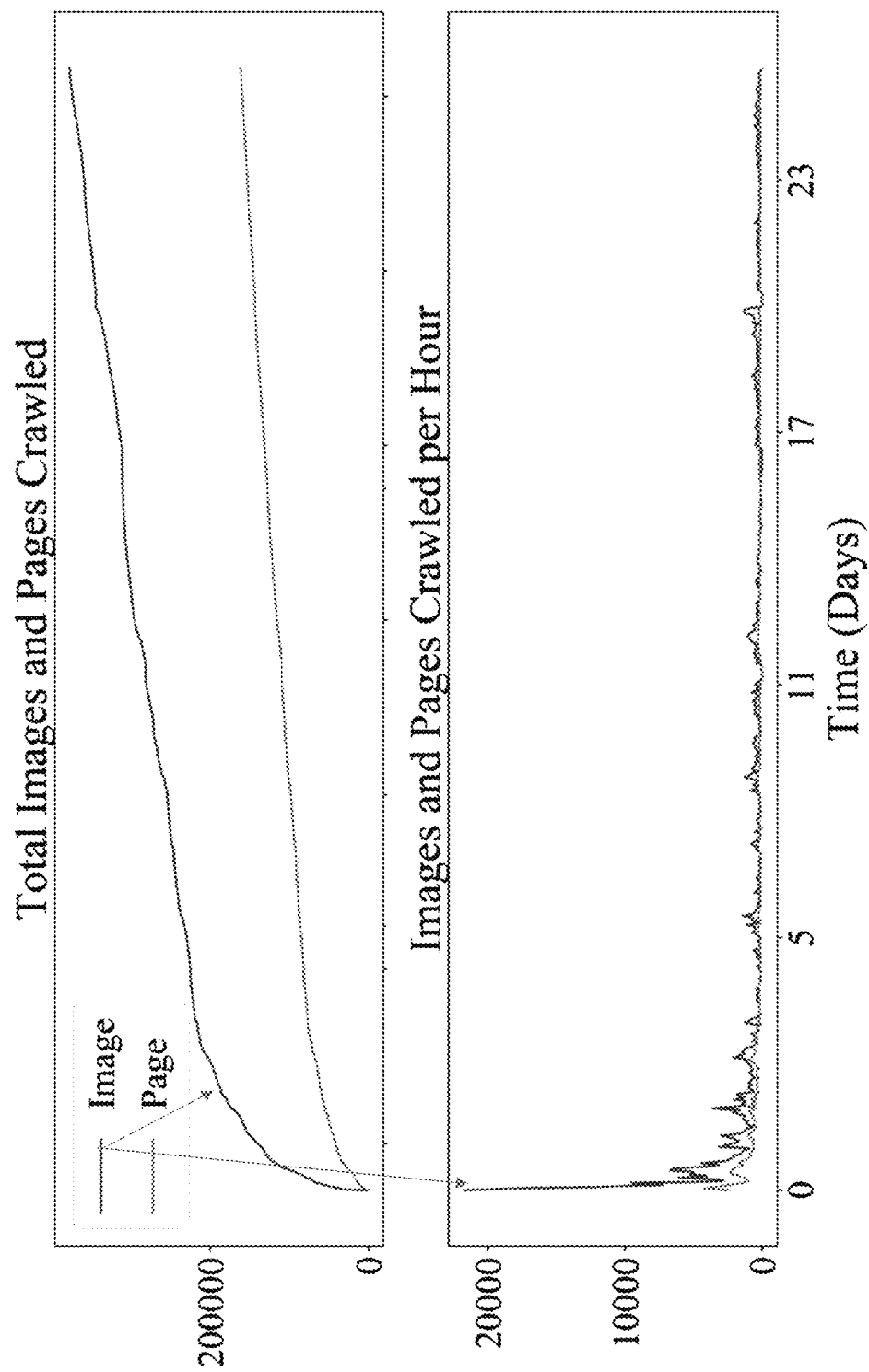
FIG. 14 provides graphs of the pages and images found by an execution of the system of the present disclosure.

The proof-of-concept Network Camera Discovery module was tested on the sample of 73 network camera sites. The network camera discovery module ran for 25 days and found 41,518 potential cameras. The module crawled 218,344 unique web pages and found 526,593 image or video data links in total. In FIG. 14, the top panel shows the total number of pages and images found by the crawler during the run. The bottom panel shows images and pages that were crawled per hour.

Of the 73 seed websites, 4 websites could not be crawled successfully. Because the web page were unreachable at the start of the crawl, no new links were generated.

Figure 15:
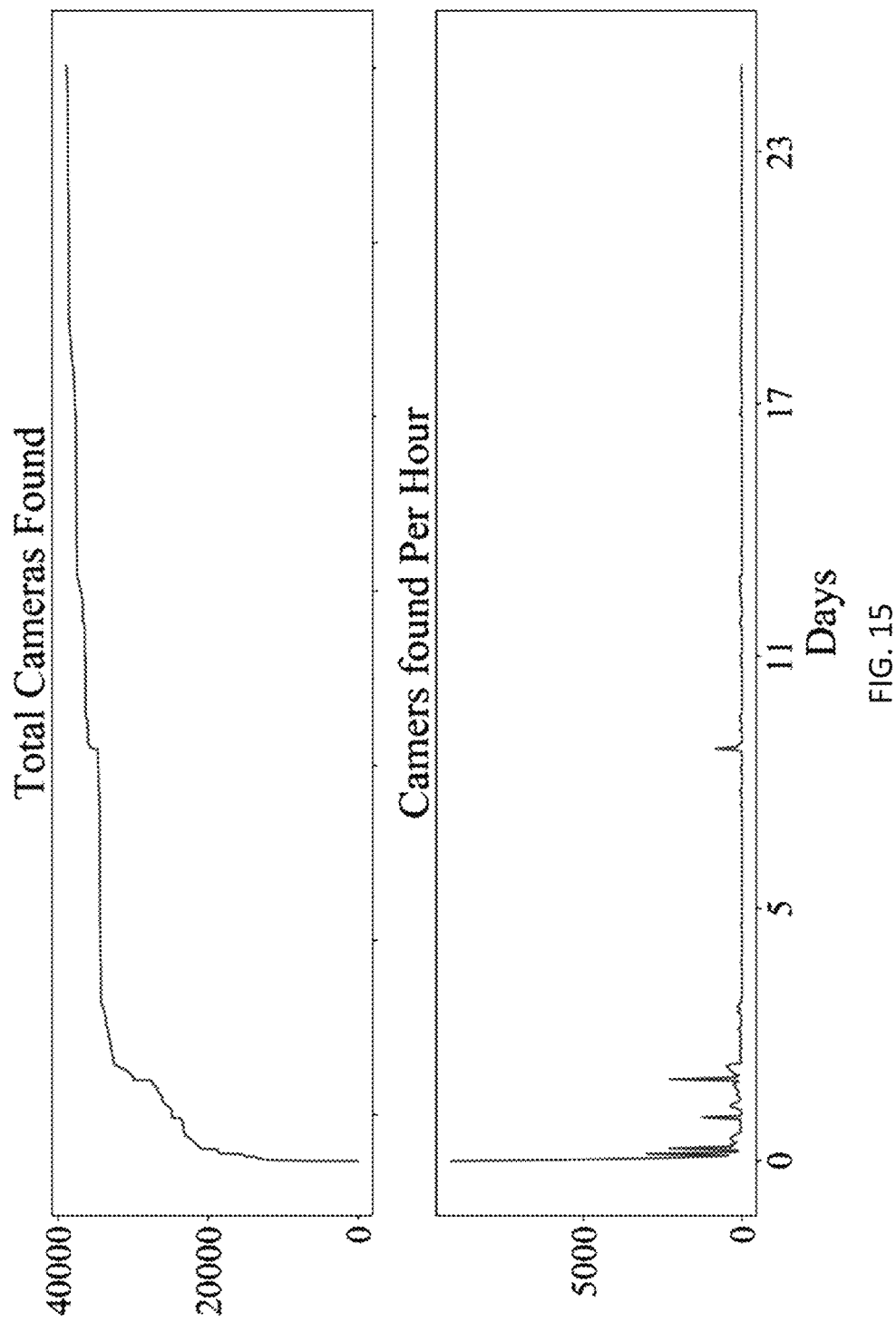
FIG. 15 provides graphs of the number of cameras over time found during an execution of the system of the present disclosure.

Potential cameras were found on 47 of the 73 websites. FIG. 15 (two panels) shows when different cameras were found, during the crawl (top panel shows the total number of cameras found and the bottom panel shows the number of cameras found per hour). Most cameras were found at the beginning of the crawl. This makes sense given that for most sites, the Web Crawler was started on the page linking directly to the camera data. As the crawl went on and fewer pages were crawled, fewer cameras were found.

TABLE 3

Streaming videos and cameras found during crawl

| Streaming | Links | % | Cameras | % |
|---|---|---|---|---|
| From HTML | 25 | <1 | 17 | 1.4 |
| From XHR | 3,949 | 99 | 1,728 | 99 |
| Total | 3,974 | | 1,745 | |

TABLE 4

Static images and cameras found during crawl

| Static Images | Links | % | Cameras | % |
|---|---|---|---|---|
| From HTML | 466,983 | 89.3 | 16,998 | 51.5 |
| From XHR | 55,636 | 10.6 | 15,960 | 48.4 |
| Total | 522619 | | 32,958 | |

Of the data links found, less than 1% were links for video data. Only 3,974 video data links were discovered by the crawler and 99% of these links were found in XHR files. Only 25 cameras were found to be embedded in the page HTML. All 25 of the embedded links were for .mjpg cameras and 17 of the 25 were network cameras. Of the 3,949 streaming data links found in XHR files, about 43% were links to network cameras. In total 1,745 streaming cameras were found from 8 different websites. A breakdown of the streaming camera data can be found in Table 3, while a tally of static images and cameras found during crawl is provided in Table 4.

Of the 465,249 unique image links found, 89% were embedded in the HTML, and the remaining 11% were found in the XHR request files. The images found in XHR requests were much more likely to be network cameras than those embedded in the page HTML. Almost 30% of images found in XHR requests were network cameras while less than 4% of HTML embedded images were found to be network cameras. Static Image Cameras were found using the average image luminance method, discussed in further detail herein.

In some cases, more cameras were reported by the camera discovery module then were estimated manually. This happened due to a few reasons. In some cases, e.g., the California Department of Transportation site, the site contains links to static camera images and streaming links, both were found by the camera discovery module. In other cases, e.g., the USGS volcano monitoring site, each camera image had a thumbnail image associated with it posted to a different URL. More examples and analysis of the sites can be found herein.

Figure 16:
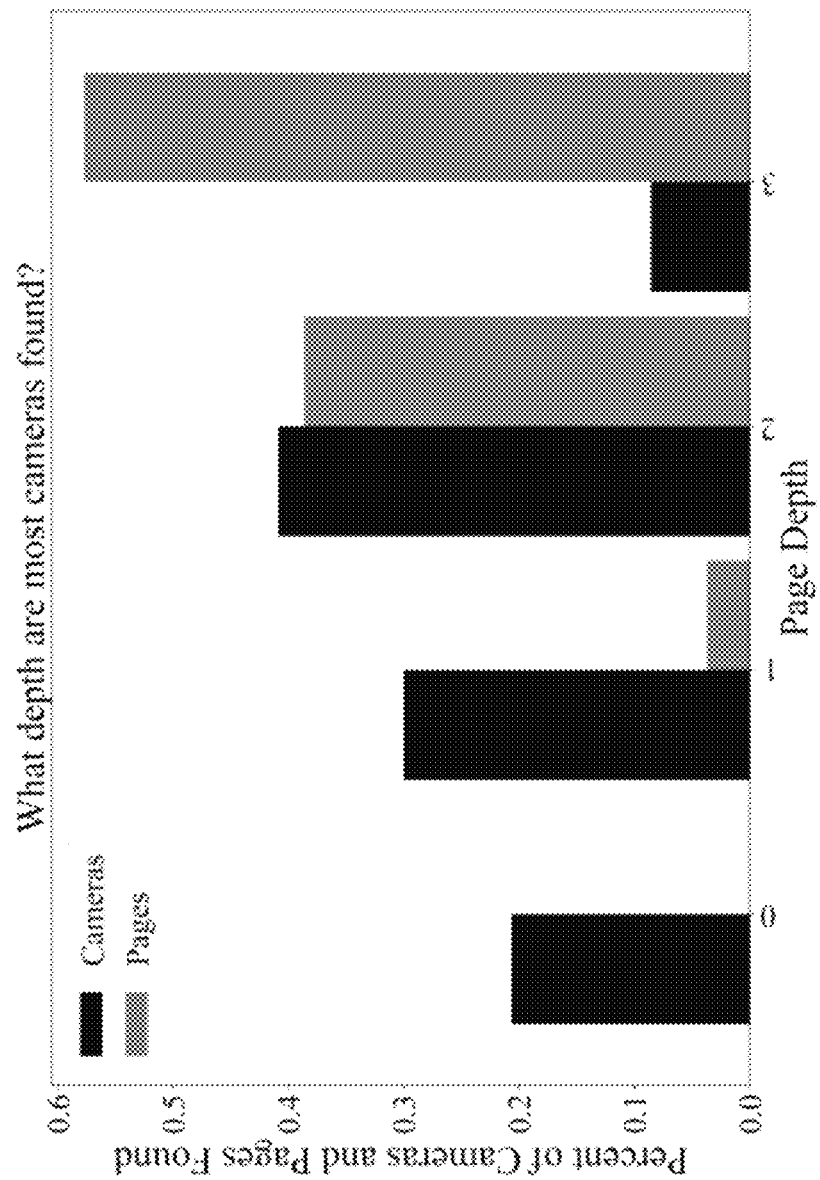
FIG. 16 is a bar graph showing the number of cameras and pages found at each page depth.
Figure 17A:
FIG. 17a shows examples of how network camera data changes over time. The images (from left to right) are taken at 0 min, 5 min, 60 min, and 12 hrs from the initial time the data link was discovered.

FIG. 16 shows the crawler did not traverse websites very deeply and only reached a max depth of 3. In this implementation, the scheduler performed a breadth first traversal of each site. This means that most pages on the seed websites could be reached within a traversal depth of 3. Although many more pages were crawled at depth 3, the majority of the cameras were found at a depth of 2.

In most cases, the image download time is accurate enough to determine if an image is from a network camera.

Analysis

The results of the proof-of-concept crawler are analyzed in more detail in some important design choices. Methods tested to differentiate between Static Image Cameras and other web assets are described, herein. A few examples of the successes and failures of the camera discovery module are also presented, herein.

Network Camera Identification Metric Analysis

Different methods can be used to differentiate between network cameras and other images indexed by the Web Crawler. Although these methods could be used for streaming network cameras, images from Static Network cameras are of particular interest. For Static Image network cameras, three methods are presented:

image change, (2) percent of total image changed between samples, (3) luminance change in between samples. Luminance change was eventually chosen to be the most successful and has been used throughout this work to determine which images were possibly from network cameras.

To evaluate each of these methods, a subset of images were randomly chosen from the static images indexed by the Web Crawler. For each image link, 4 sample images were taken by the camera identification module. These samples were manually compared by a human labeler.

Each set of sample images from one data link was given a single label of one of the following categories:

Network Camera Any chosen data link where images changed between samples. The samples from the link also had to resemble network camera images. See FIG. 17a.

Frozen Camera Any chosen data link that resembled network camera images but did not change from sample to sample. See FIG. 17b.

Other Web Assets Any other chosen data link where sample images does not resemble a network camera. See FIG. 17c. These images could also change from sample to sample like those in FIGS. 20a, 20b, and 20c.

Figure 20A:
FIGS. 20a, 20b, and 20c are examples of false positives identified by the system of the present disclosure.
Figure 20B:
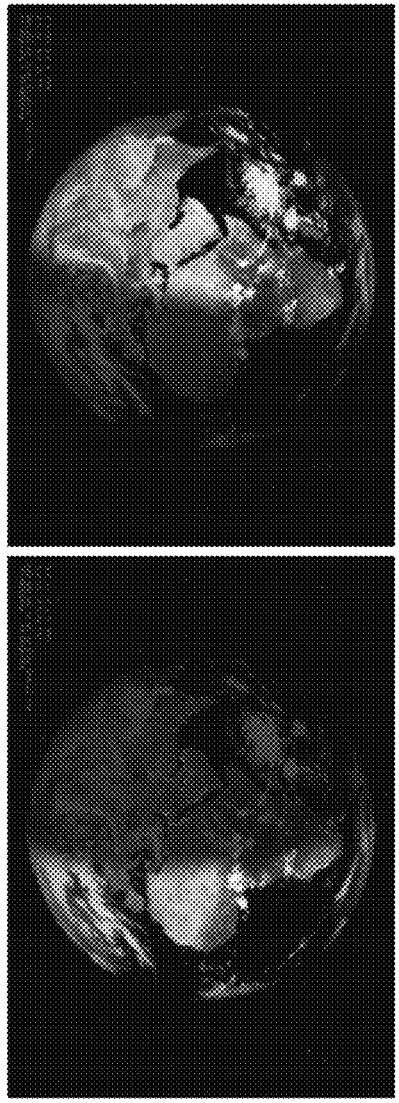
Figure 20C:

For links labeled Network Cameras, labelers looked for links to data where samples turned from night to day or day to night. For data links to cameras positioned indoors, labelers looked for changes between samples to ensure the image changed from one sample to another. Samples that did not change over time but appeared to be from network cameras were classified as Frozen Cameras. Images like logos, map parts, and icons were labeled as Other Web Assets. In some cases the web assets changed over time but the data did not appear to be from a network camera. FIGS. 20a, 20b, and 20c show examples of some such data.

During the labeling process, the labeler was shown all the samples taken by the Network Camera Identification module, along with an indication of the number of pixels that changed between the samples. If there was no change in the image between samples, the image could not be labeled as a network camera.

In total, 7,844 images were manually labeled. This represents about 2% of the total images indexed by the crawler. 464 (5.9%) of the images were found to be from Network Cameras. 639 images (8.1%) were found to be Frozen Cameras or potential network cameras that did not change. The remaining 6744 (86%) of images were other web assets.

The first and simplest method of discriminating between network camera images and static images is to check if the image changed at all between samples. This method is efficient and only requires the Network Camera Identification module to find one pixel that has changed between the two samples. This check was implemented with Algorithm 1 called on the samples taken at t0 and t0+12 hours. If Algorithm 1 returned a number greater than zero the image was considered to be a network camera. This method identified 818 of the labeled images as network cameras. The recall of this method was 100% because an image had to have changed to be classified as a network camera. However, there was a high number of false positives (images that changed but were not from network cameras). As a result, the precision was 56.3%.

---
Algorithm 1 Simple Change
---
1: procedure PERCENTDIFF(img1, img2)
2:    count ← 0
3:    for px = 0.1.....SIZE(img1) do
4:        count ← count+|img1[px] − img2[px]| > 0
5:    return count/SIZE(img1)
6: if PERCENTDIFF(sample0, sample12hrs) > 0 then
7:    return True        ▷ Image is a Camera
8: else
9:    return False       ▷ Image is not a Camera
---

Figures 19A, 19B:
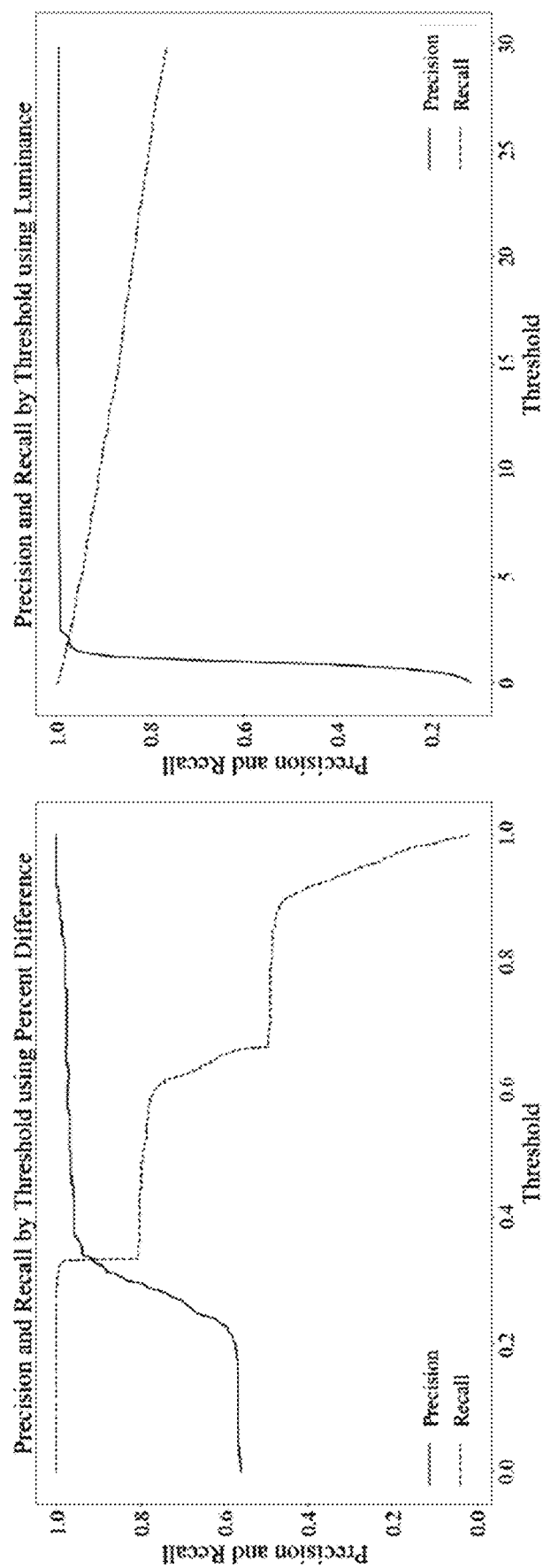
FIGS. 19a and 19b are comparison between different methods for network camera identification based on precision and recall by threshold using percent difference (19a) and based on precision and recall by threshold using luminance (19b).

The next method finds the percentage of pixels that changed between the first sample image and each of the following sample images. A linear combination between the percentage change for each sample relative to the initial sample was used to determine a threshold experimentally. Algorithm 2 shows how this method is implemented. FIG. 19a shows a graph of the precision recall over different thresholds. The most accurate threshold for the linear combination was 0.333 which identified 469 of the labeled data links as network cameras. The precision of this method was 91.2% and the recall of 92.8%.

---
Algorithm 2 totalPcntDiff
---
1: diff ← 0
2: diff ← diff + PERCENTDIFF(sample0, sample5min)
3: diff ← diff + PERCENTDIFF(sample0, sample60mins)
4: diff ← diff + PERCENTDIFF(sample, sample12hrs)
5: if diff > 0.333 then
6:    return True        ▷ Image is a Camera
7: else
8:    return False       ▷ Image is not a Camera
---

The final and most successful method was the change in luminance between the samples, as shown in FIG. 19b. For this method, shown in Algorithm 3, the mean pixel value of the image was taken for each sample collected. The difference between the mean luminance of the image for the sample taken at t0 and t0+12 hours. This time was chosen in order to capture the day/night cycle of outdoor cameras. This method had a precision on the labeled data of 97.2% and a recall of 97.2% at the optimum difference threshold of 2.1 between the images.

---
Algorithm 3 luminanceDiff
---
1: img1Lum ← MEAN(sample0)
2: img12Lum ← MEAN(sample12hrs)
3: diff ← ABS(img1Lum − img12Lum)
4: if diff > 1.2 then
5:    return True        ▷ Image is a Camera
6: else
7:    return False       ▷ Image is not a Camera
---

Figure 18:
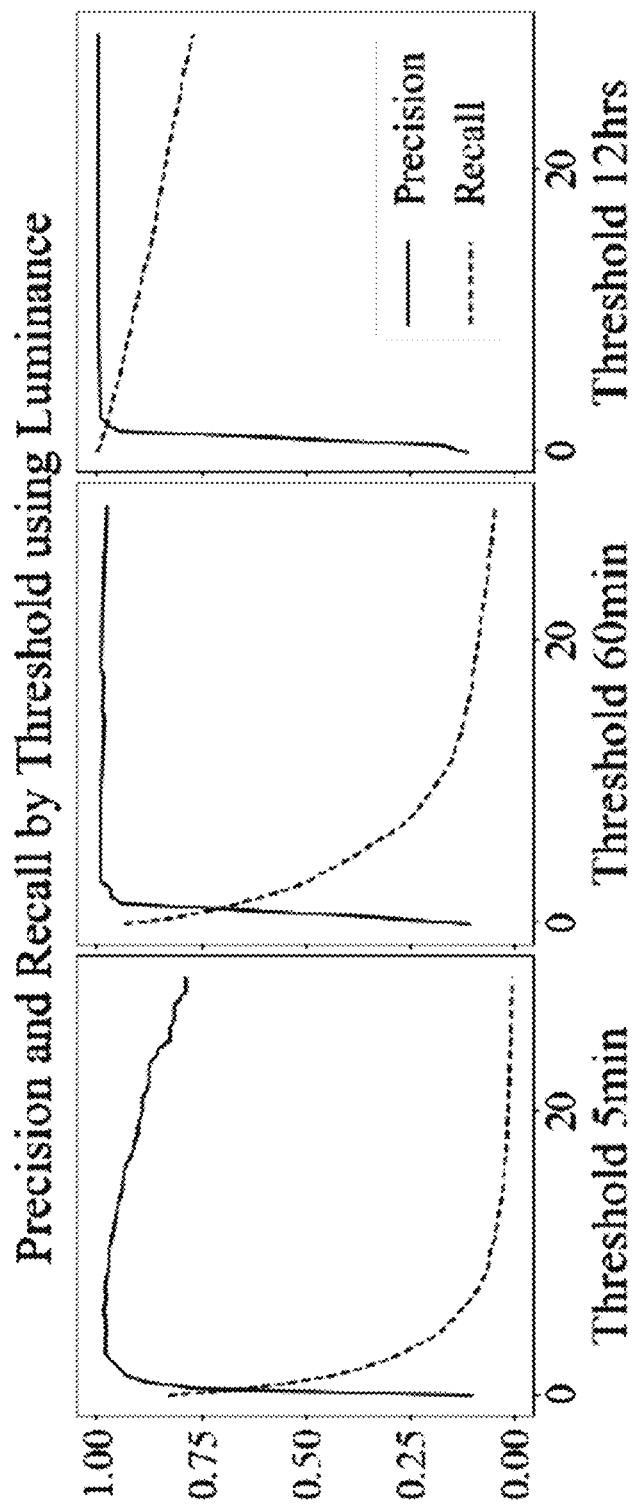
FIG. 18 shows the precision and recall of different thresholds for luminance change. The threshold is on the x-axis and each graph represents the difference between the first image taken and the image taken at 5 min, 60 min, and 12 hrs respectively.

FIG. 18 shows the precision and recall chart for the three samples taken at 5 min, 60 min, and 12 hrs after the initial image was discovered. The difference between sample t0 and sample t0+12 hours is the most accurate. This is likely due to the large change in luminance from day to night over a 12 hour period. In the future, more sample images could be taken to further improve the accuracy.

FIGS. 20a, 20b, 20c show some examples of false-positive classifications of the image luminance method. CAPTCHA errors (FIG. 20a) are a common false-positive classification for the change in luminance. These images are hard to classify correctly and need more advanced computer vision metrics. A few computer generated images were also incorrectly classified as network cameras by the luminance metric. FIG. 20b shows one such example that was updated to the same URL as a network camera would be but instead shows the movement of the sun on the earth. The example in FIG. 20c is another possible source of false-positive classifications. In this example, the image was not from a network camera but changed. This is likely because someone updated the website between the time the second and third sample were downloaded. These errors show that the metrics used to determine if a data link is from a network camera could improve. Potential solutions to these problems are discussed herein.

Website Examples

Examples from two categories of the 73 tested domains are described, herein. In addition, sites where the crawler did not find any camera data are also discussed below. The sites where the camera discovery module collected significantly more data are also discussed below as compared to what was expected from the manual estimate. Duplicate camera data was found on the associated sites.

Few Cameras Found.

No camera data was found on 26 of the 73 sites studied. For 9 of these sites the Web Crawler was unable to identify any camera data or streaming links on any pages. In many cases, this was because the site did not properly load in the browser, or the website would exceed the 180 second timeout of the crawler.

In a few cases, the crawler was able to identify the camera data but the data did not change. This was the case for the Indiana Department of Transportation website. During the crawl, the links to the camera data on the site were discovered by the crawler. No cameras were identified at the site because the cameras stopped updating before the samples were taken. The site later went offline for maintenance.

On The Snow, a travel camera website, is another example of a site where no cameras were found even though 5,743 pages were crawled and 20,264 images were discovered. Many of the cameras are not directly embedded in the site and the user must click on a play button where a time-lapse of images from the last 24 hours are shown in a short video.

Another site that the camera was unable to collect all the camera data was the WorldCam website. This site has 14,847 cameras listed and many come from the community posting links to the cameras. Almost none of the cameras on this site are embedded directly on the site. Only 164 cameras were found on this site. This is because the crawler was limited to following links only from the initial domain.

These examples showcase the most prevalent errors with the proof-of-concept experiment. In some cases, finding the cameras on these websites requires that the Web Crawler visit additional domains. In other cases, the crawler will need additional methods of extracting and identifying camera data.

Duplicate Cameras Found. On 23 sites, the amount of camera data indexed was greater than the expected number of cameras on each site. This usually happens because the camera data is assigned multiple different links across the site. The most common example is sites that have query strings in the image links, similar to those discussed herein. For example, all have or timestamps after the camera links.

Figures 21A, 21B:
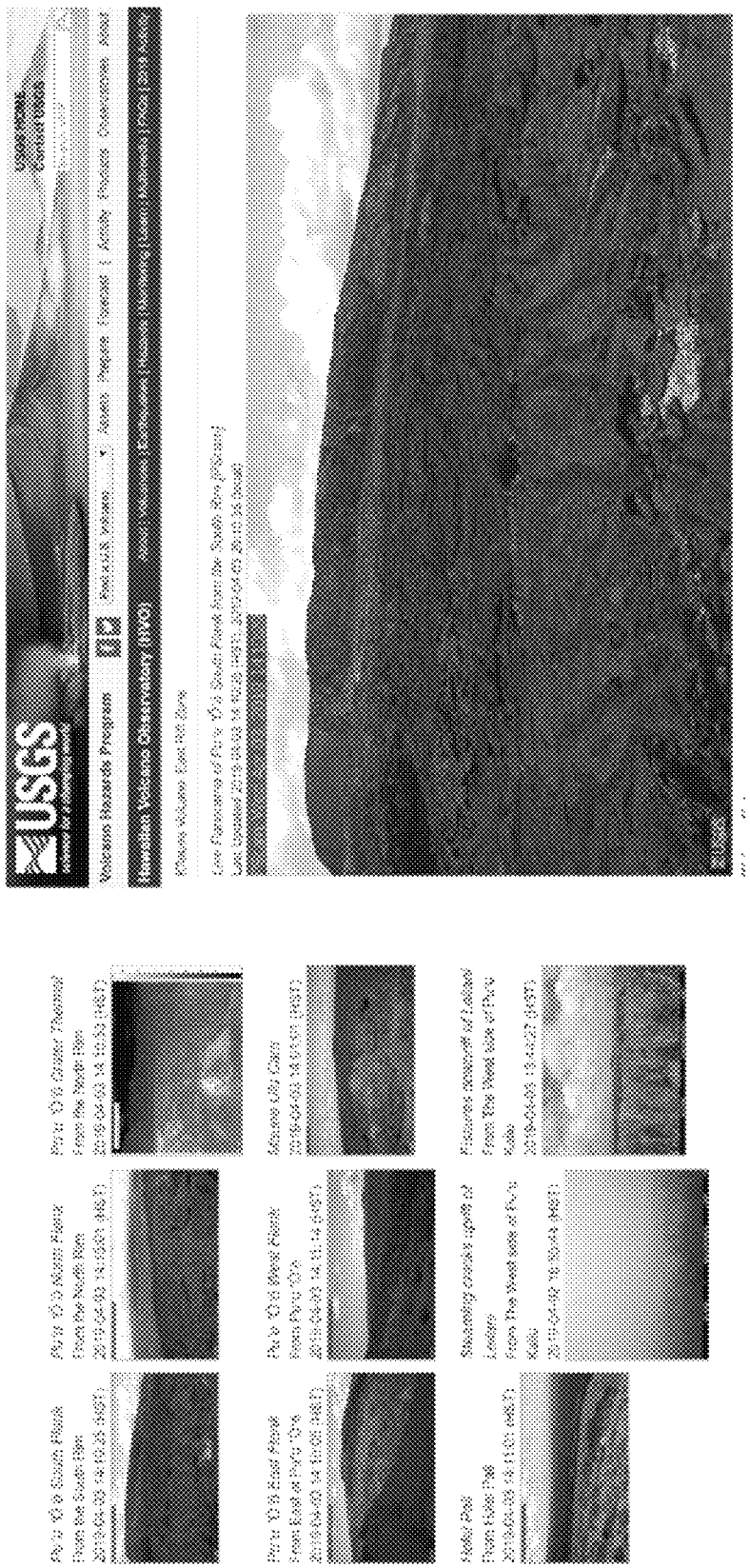
FIGS. 21a-21b show how images can be duplicated on the same website. In particular.

FIG. 21a shows an example of thumbnails, another common error of the Camera Discovery Module. Sites with thumbnails may have multiple links to the same data, some are resized for display in a list that links to the full size image.

Some sites have links to both streaming and static camera data or cameras that have streams available in multiple formats. The Camera Discovery module will index a new camera for every data link found.

According to one embodiment, this work provides an in-depth look at how network camera information is distributed on the Internet. The method of the present disclosure provides for indexing this valuable data source automatically and methods to determine on a given web page, what data on the page is from a network camera. A proof-of-concept version of the network camera discovery system according to the present disclosure was successfully able to identify 41,518 potential network camera data links from 218,344 unique web pages over a 25 day test run.

The data found by the Automated Network Camera Discovery system presented in this work can create a repository of the thousands of public network cameras all around the world.

Those having ordinary skill in the art will recognize that numerous modifications can be made to the specific implementations described above. The implementations should not be limited to the particular limitations described. Other implementations may be possible

The invention claimed is:

1. A method for indexing network camera data across heterogeneous web page structures, comprising:
   receiving a list of predetermined file formats associated with network camera data;
   generating a list of IP addresses associated with potential network cameras;
   transmitting a HyperText Transfer Protocol (HTTP) request to each of the IP addresses in the list, thereby invoking a response,
   waiting for a response from each of the IP addresses, wherein based on a response or lack of response from each IP address to the HTTP request determine if an IP address is i) a network camera thereby adding the corresponding IP address to a list of network cameras, ii) a website thereby adding the corresponding IP address to a list of websites to be further investigated, or iii) an IP address void of network camera information thereby skipping the IP address; and
   crawling the IP addresses that have been determined to be websites using a web crawler identifying IP addresses of network cameras and the IP address and resource path associated with network camera data and adding the identified IP addresses and resource paths to the list of network cameras.

2. The method of claim 1, wherein the predetermined file formats represent an image format.

3. The method of claim 2, wherein the image format is selected from the group consisting of JPEG, JFIF, TIFF, GIF, BMP, PNG, PPM, PGM, PBM, PNM, HDR, HEIF, BAT, and BPG.

4. The method of claim 1, wherein the predetermined file formats represent a video format.

5. The method of claim 4, wherein the video format is selected form the group consisting of MP4, 3GP, OGG, WMV, WEBM, FLV, AVI, and QT.

6. The method of claim 1, wherein the IP addresses are generated by using format of valid IP addresses.

7. The method of claim 1, wherein the IP addresses are generated based on an organization and IP addresses associated with the organization's name.

8. The method of claim 1, wherein the IP address is associated with a network camera by comparing the response from the IP address with the predetermined file formats.

9. The method of claim 1, wherein an IP address is determined to be a webpage by transmitting to the associated IP address and resource path a request for a download, and receiving a webpage response from the associated IP address and resource path.

10. The method of claim 1, wherein the crawling step comprises:
    downloading the webpage associated with the IP address and resource path;
    rendering the downloaded webpage to thereby identify one or more hyperlinks to other hyperlinked webpages or one or more hyperlinked network cameras;
    recursively repeating steps downloading the webpages and rendering the downloaded webpages for all hyperlinked webpages;
    for the identified hyperlinked webpages requesting the IP addresses and resource paths associated with the identified hyperlinks and adding any discovered IP addresses and resource paths containing network camera data from the set of requested IP addresses and resource paths to the list of network cameras; and for the identified one or more network cameras adding the corresponding IP address of network cameras to the list of network cameras.

11. The method of claim 10, wherein the one or more identified hyperlinks are associated with HTML or XHR files.

12. The method of claim 10, further comprising:
for each of the one or more identified hyperlinks, determining whether the one or more hyperlinks contain one or more embedded images;
linking to the one or more embedded images;
determining if the one or more embedded images represent a live data stream and add the associated IP address and resource path to the list of network cameras.

13. The method of claim 12, wherein the step of determining live data stream includes:
monitoring the one or more embedded images based on a predetermined interval; and
if recognizing changes in the embedded images within the predetermined interval, then determine the associated IP address and resource path as a network camera.

14. A method for indexing network camera data across heterogeneous web page structures, comprising:
receiving a list of predetermined file formats associated with image or video data;
generating a list of IP addresses associated with potential network cameras;
transmitting a network request to each of the IP addresses in the list, thereby invoking a response,
waiting for a response from each of the IP addresses, wherein based on a response or lack of response from each IP address to the network request determine if an IP address is i) a network camera thereby adding the corresponding IP address to a list of network cameras, ii) a website thereby adding the corresponding IP address to a list of websites to be further investigated, or iii) an IP address void of network camera information thereby skipping the IP address; and
crawling the IP addresses that have been determined to be websites using a web crawler identifying IP addresses of network cameras and the IP address and resource path associated with network camera data and adding the identified IP addresses and resource paths to the list of network cameras.

15. The method of claim 14, wherein the network request is one or more of a HyperText Transfer Protocol (HTTP) request and Real-time Streaming Protocol (RTSP) request.

16. The method of claim 14, wherein the IP addresses are generated based on an organization and IP addresses associated with the organization's name.

17. The method of claim 14, wherein the IP address is associated with a network camera by comparing the response from the IP address with the predetermined file formats.

18. The method of claim 14, wherein an IP address is determined to be a webpage by transmitting to the associated IP address and resource path a request for a download, and receiving a webpage response from the associated IP address and resource path.

19. The method of claim 14, wherein the crawling step comprises:
downloading the webpage associated with the IP address and resource path;
rendering the downloaded webpage to thereby identify one or more hyperlinks to other hyperlinked webpages or one or more hyperlinked network cameras;
recursively repeating steps downloading the webpages and rendering the downloaded webpages for all hyperlinked webpages;
for the identified hyperlinked webpages requesting the IP addresses and resource paths associated with the identified hyperlinks and adding any discovered IP addresses and resource paths containing network camera data from the set of requested IP addresses and resource paths to the list of network cameras; and
for the identified one or more network cameras adding the corresponding IP address of network cameras to the list of network cameras.

20. The method of claim 19, wherein the one or more identified hyperlinks are associated with HTML or XHR files.

* * * * *